United States Patent [19]

Mori

[11] Patent Number: 5,105,378
[45] Date of Patent: Apr. 14, 1992

[54] HIGH-RADIX DIVIDER

[75] Inventor: Junji Mori, Yokohama, Japan

[73] Assignee: Kabushiki Kaisha Toshiba, Kawasaki, Japan

[21] Appl. No.: 717,045

[22] Filed: Jun. 18, 1991

[30] Foreign Application Priority Data

Jun. 25, 1990 [JP] Japan .................. 2-166202

[51] Int. Cl.$^5$ .............................................. G06F 7/52
[52] U.S. Cl. .................................................... 364/761
[58] Field of Search .............................. 364/761–764, 364/767

[56] References Cited

U.S. PATENT DOCUMENTS

| 4,722,069 | 1/1988 | Ikeda .................... | 364/767 |
| 4,761,757 | 8/1988 | Sakai et al. ............ | 364/761 |
| 4,979,139 | 12/1990 | Nakayama ............. | 364/761 X |
| 4,979,142 | 12/1990 | Allen et al. ............ | 364/767 |
| 4,989,173 | 1/1991 | Kaneda ................. | 364/764 |
| 4,996,660 | 2/1991 | Beacom et al. ........ | 364/761 X |

OTHER PUBLICATIONS

Computer Arithmetic (Principles, Architecture and Design), Chap. 7, Section 9, "Robertson's High Radix Division", pp. 235–238, no publication date.

Primary Examiner—Tan V. Mai
Attorney, Agent, or Firm—Finnegan, Henderson, Farabow, Garrett, and Dunner

[57] ABSTRACT

A dividend or partial remainder is stored in a partial remainder register. An output of the partial remainder register is shifted to the left by a radix which uses the power of 2 and is larger than 2. A divisor is stored in a divisor register. Comparison constants obtained by subjecting an output of the divisor register to predetermined operations are stored in comparison constant registers. Subtracters respectively receive outputs of the comparison constant registers as one input, receive upper bits of a bit number representing a precision required for conversion and included in the output of the partial remainder shifter as another input, and compare the magnitudes of the two inputs with each other to derive partial quotients. A selector shifts and selects an output of the divisor register according to the signs of the remainder quotients output from the subtracters to create a factor having a value equal to the integer multiple of the divisor. An adder/subtracter receives an output of the selector and an output of the partial remainder shifter and the addition or subtraction of the adder/subtracter is selectively specified by the sign bit of an output of the partial remainder shifter to derive a partial remainder.

6 Claims, 4 Drawing Sheets

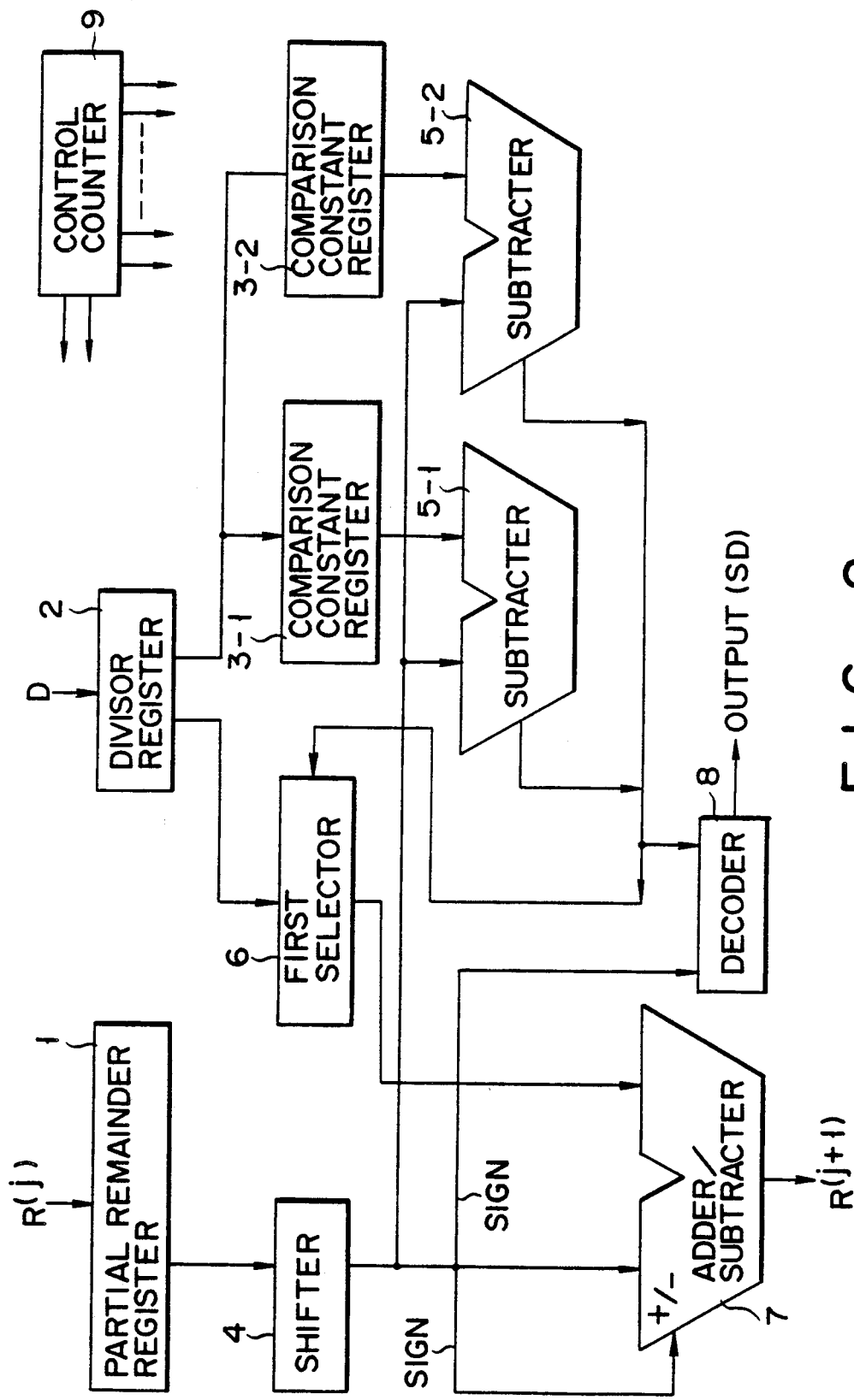
F I G. 2

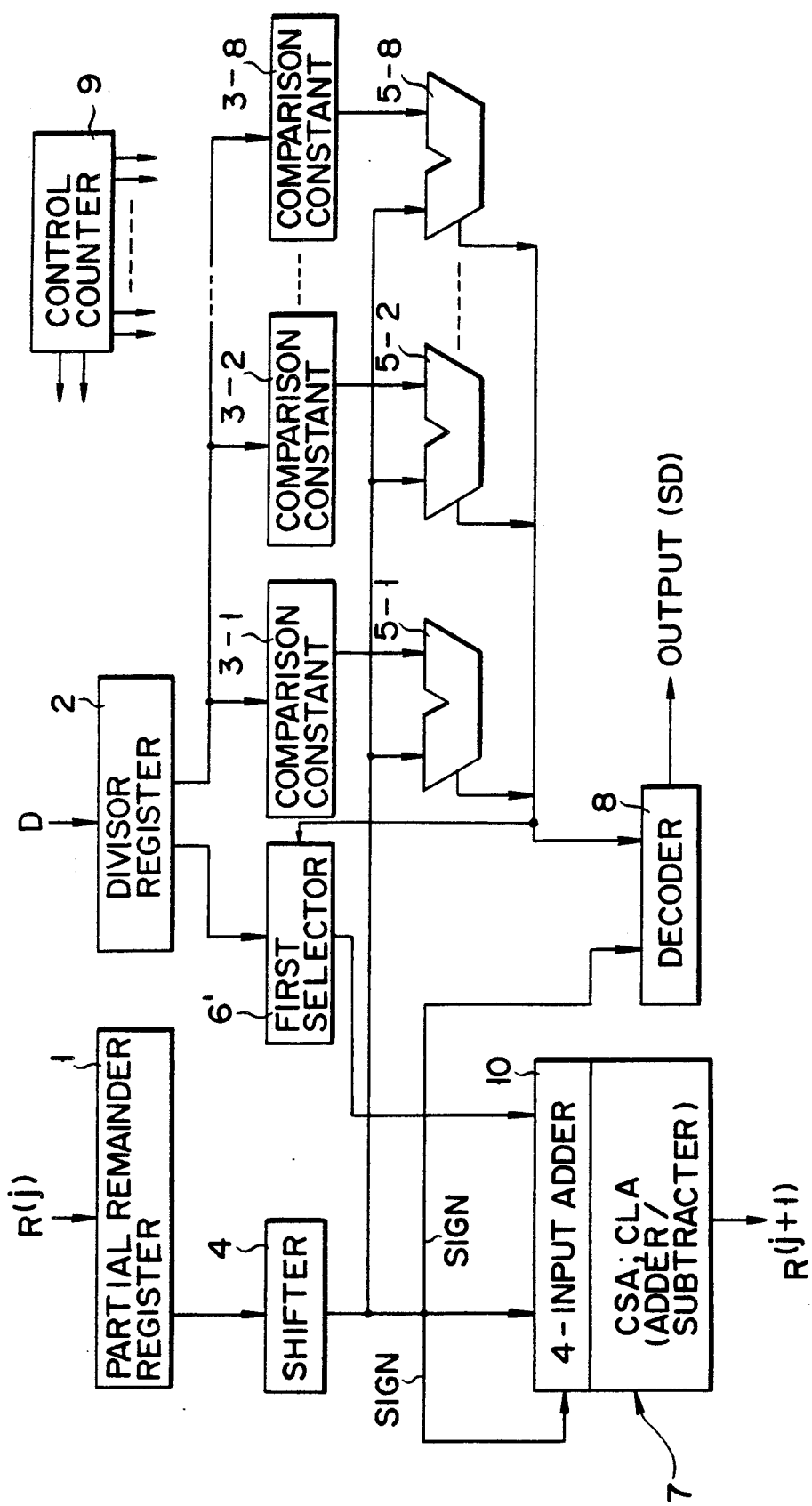
F I G. 4

HIGH-RADIX DIVIDER

BACKGROUND OF THE INVENTION

1. Field of the Invention

This invention relates to a hardware divider used in an integrated floating processor unit (FPU), and more particularly to a high-radix divider.

2. Description of the Related Art

Recently, as one-chip microcomputers with highly sophisticated functions have been developed, the functions of FPUs are increasingly enhanced and the multiplication can be effected with doubled precision by 1 to 3 clocks by means of a hardware multiplier. In a case wherein a hardware divider whose operation is effected in parallel with the other operations is used, an algorithm of restoring, nonrestoring, SRT (Sweeney Robertson Tocher), high radix division or the like based on a repetition operation system and a convergence type division algorithm based on the Newton-Raphson method may be considered to be used.

FIG. 1 schematically shows a conventional hardware divider utilizing the nonrestoring algorithm based on the repetitive operation system. A partial remainder register 41 stores a dividend in the initial period of the operation and then stores a partial remainder $R^{(j)}$ in the remaining period. A partial remainder shifter 42 shifts the output of the partial remainder register 41 to the left by the radix. A divisor register 43 stores a divisor D. An adder/subtracter 44 effects the addition of or subtraction between data input from the partial remainder shifter 42 and data input from the divisor register 43 to output a partial remainder $R^{(j+1)}$. A control counter 45 controls the operation timing of the above respective circuits.

In general, the conventional hardware divider utilizing the nonrestoring algorithm based on the repetitive operation system effects the division according to the following convergence equation when the radix is set to 2, the partial remainder in the preceding cycle is expressed by $R^{(j)}$, the partial remainder in the current cycle is expressed by $R^{(j+1)}$, the partial quotient is expressed by Q and the divisor is expressed by D.

$$R^{(j+1)} = 2R^{(j)} - QD$$

(when j in the partial remainder $R^{(j)}$ is 0, a dividend is $R^{(O)}$.

The above division system has an advantage that each time the operation for the operation loop is effected by one cycle in response to one clock, one bit of the partial quotient Q can be determined and the quotient Q can be determined based on the sign of the partial remainder $2R^{(j)}$ in the preceding cycle when the partial quotient Q is $\{-1, 1\}$.

However, in the operation with doubled precision effected by the FPU and defined by the IEEE standard, a mantissa portion has as many as 54 bits (a mantissa of 53 bits and a sign of 1 bit) and at least 54 clocks are necessary for effecting the division. Therefore, the latency (latent time from the instruction input to the operation output) of the operation for requiring the result of division becomes long, thereby significantly increasing the processing time. Further, in order to effectively utilize the parallel operability of the divider using the above division system, a high technique is required for the arrangement of operation instructions and it is almost impossible to use the divider to the full extent if the machine language is created by use of the compiler.

The convergence type division algorithm based on the Newton-Raphson method may be effective at an operation speed corresponding to the latency. However, since the algorithm requires two multiplications and one addition in the convergence equation and the initial value approximation, a read only memory having a certain amount of memory capacity is required. Further, in a general computation, since the number of operations of division is smaller than that of multiplication, the investment effect of the hardware divider using the convergence type division algorithm is small and the performance thereof becomes low since the multiplication and addition/subtraction cannot be effected while the division is being effected.

As described above, since the conventional hardware divider utilizing the nonrestoring algorithm based on the repetitive operation system has a radix of 2, at least 54 clocks are necessary when the division with doubled precision is effected by the FPU. For this reason, the latency of the operation requiring the result of the division becomes long and the processing time becomes significantly long. Further, it is difficult to effectively utilize the parallel operability of the divider.

SUMMARY OF THE INVENTION

Accordingly, an object of this invention is to provide a high-radix divider capable of effecting high-speed division by use of a small amount of hardware.

The above object can be attained by a high-radix divider comprising a first register for storing a dividend or a partial remainder; a shifter for shifting an output of the first register to the left by a radix which uses the power of 2 and is larger than 2; a second register for storing a divisor; a plurality of third registers for storing comparison constants obtained by subjecting an output of the second register to predetermined operations; a plurality of magnitude comparators for respectively receiving outputs of the plurality of third registers as one input, receiving upper bits of a bit number representing a precision required for conversion and included in the outputs of the shifter as another input, and comparing the magnitudes of the two inputs with each other to derive partial quotients; a selector for shifting and selecting the output of the second register according to the signs of the partial quotients output from the plurality of magnitude comparators to create a factor having a value equal to the integer multiple of the divisor; and an adder/subtracter for receiving the outputs of the selector and the shifter, the addition or subtraction of the adder/subtracter being selectively specified by a sign bit of the output of the shifter.

In a high-radix divider with the above construction, the comparison constants obtained by subjecting the divisor to the predetermined operations and the partial remainder obtained in the preceding cycle are compared (subtracted) with each other by means of the magnitude comparators (subtracters) to derive a partial quotient which permits the partial remainder obtained in the current cycle to be set within a convergence range. The divisor is multiplied by a constant according to the sign of the partial quotient to create a factor having a value equal to the integer multiple of the divisor and an addition of or a difference between a number derived by shifting the partial remainder in the preceding cycle to the left by the radix and the factor having the value equal to the integer multiple of the divisor is derived according to the sign bit of the shifted number so as to obtain a partial remainder in the current cycle. A quotient expressed by a sign r-scale notation (sign digit (SD) of the high radix) can be obtained by selecting the sign of the number derived by shifting the partial remainder in the preceding cycle to the left by the radix and the sign of the partial quotient and sequentially storing the same into the shift register.

Since a plurality of bits of the partial quotient are determined based on the above principle each time the operation for the operation loop is effected by one cycle in response to one clock, a high-speed division whose operation speed is $\log_2 r$ (r is the radix) times as high as that obtained by the conventional hardware divider utilizing the nonrestoring algorithm based on the repetitive operation system using the radix of 2 can be attained. Further, the comparison (subtraction) between the comparing constants obtained by subjecting a divisor to predetermined operations and the partial remainder in the preceding cycle is not necessarily effected for all of the bits, and if an error is limited within the redundancy range of the partial remainder, the error can be compensated for in the next operation cycle. More specifically, when a 54-bit division is effected, it is sufficient if, for example, 6 bits of the shifted partial remainder are selected as a bit number representing the precision necessary for convergence and subjected to the comparison, and therefore an amount of hardware can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the genera description given above and the detailed description of the preferred embodiments given below, serve to explain the principles of the invention.

FIG. 2 is a block diagram schematically showing a high-radix divider according to a first embodiment of this invention; and FIGS. 3 and 4 are diagrams schematically showing high-radix dividers according to second and third embodiments of this invention.

DETAILED DESCRIPTION OF THE PREFERRED EMBODIMENTS

Figure 1:
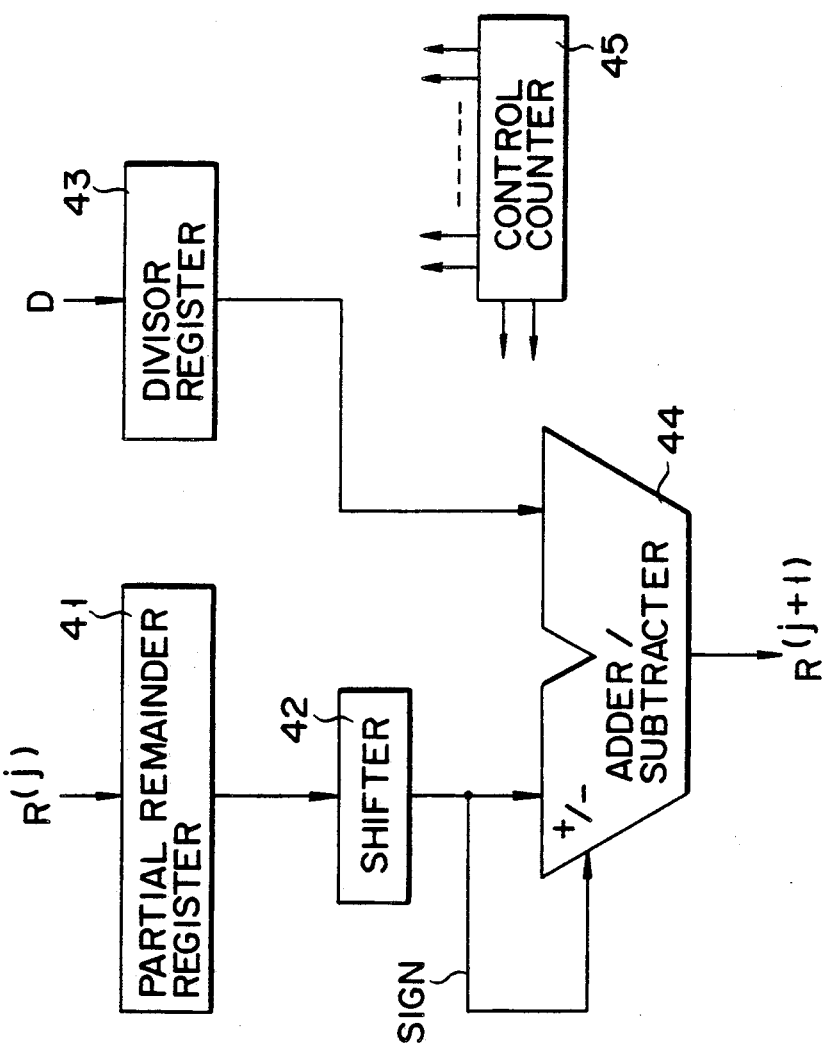
FIG. 1 is a block diagram schematically showing a conventional hardware divider using a nonrestoring algorithm based on the repetitive operation system.

First, a principle of a division system using an algorithm of the high-radix SRT division based on the repetitive operation system used in this invention is briefly explained. Assuming that a radix which uses the power of 2 and is larger than 2 is represented by r, the partial remainder in the preceding cycle is represented by $R^{(j)}$, the partial remainder in the present cycle is represented by $R^{(j+1)}$, the partial quotient is represented by Q and the divisor is represented by D, then the convergence equation can be expressed as follows:

$$R^{(j+1)} = rR^{(j)} - QD$$

(when j in the partial remainder $R^{(j)}$ is 0, a dividend is $R^{(0)}$).

In the above division system, it is necessary to derive a partial quotient Q which permits the partial remainder obtained in the current cycle to be set within a convergence range by comparing (subtracting) the comparison constants obtained by subjecting the divisor D to the predetermined operations and the partia remainder $R^{(j)}$ obtained in the preceding cycle with each other. The divisor D is multiplied by a constant according to the sign of the partial quotient Q to create a factor having a value equal to the integer multiple of the divisor and an addition of or a difference between a number derived by shifting the partial remainder in the preceding cycle to the left by the radix and the factor having the value equal to the integer multiple of the divisor is derived according to the sign bit of the shifted number so as to obtain a partial remainder $R^{(j+1)}$ in the current cycle. A quotient expressed by a sign r-scale notation (sign digit (SD) of the high radix) can be obtained by selecting the sign of the number derived by shifting the partial remainder $R^{(j)}$ in the preceding cycle to the left by the radix and the sign of the partial quotient Q and sequentially storing the same into the shift register.

When the radix is set to 4, the number of circuits for subjecting the divisor D to predetermined operations and the number of subtracters for comparing the outputs of the circuits with the partial remainder $R^{(j)}$ in the preceding cycle are respectively set to 2 and these numbers become larger as the radix becomes higher.

Further, when the radix is set to 4, a set of numbers for the partial quotient Q becomes $\{-2, -1, 0, 1, 2\}$, and when a higher radix of 8 or 16 is used, a set of numbers for the partial quotient Q increases to $\{-4, -3, \text{---}, 0, \text{---}, 3, 4\}$ or $\{-8, -7, \text{- ---}, 0, \text{---}, 7, 8\}$ but the circuit for multiplying the divisor D by the constant according to the sign of the partial quotient Q can be obtained by a combination of a shifter and a selector.

In order to enhance the operation speed of the adder/subtracter, the circuit of a stage other than the final stage is constructed by a carry-save type adder (CSA) and the final stage circuit is constructed by a carry-look-ahead type adder (CLA) and/or a carry-select type adder to suppress the carry transfer, and it is preferable to use a 4-2 comparator (4-input adder) as an input circuit of the above adder/subtracter when the radix is set to 16.

Further, in order to obtain the quotient represented by an ordinary binary notation, a circuit for creating positive and negative partial quotients according to the signs of outputs of a plurality of subtracters and two shift registers for shifting and storing the positive and negative partial quotients are provided and a circuit for permitting the values stored in the two shift registers after the completion of convergence of the division is provided, and an operation is effected by use of the above adder/subtracter to obtain a quotient represented by the binary notation.

Next, a high-radix divisor according to a first embodiment of this invention is explained with reference FIG. 2. In FIG. 2, a hardware divider (high-radix divider) based on the repetitive operation system utilizing the nonrestoring algorithm of SRT division using a radix of 4 is schematically shown. A first register (partial remainder register) 1 stores a dividend or a partial remainder $R^{(j)}$ in the preceding cycle. A second register (divisor register) 2 stores a divisor D. Third registers 3-1 and 3-2 store comparison constants obtained by subjecting the output (divisor D) from the second register to predetermined operations. In this case, the above operations may be different according to the radix, the precision and bit width of the divisor D, but since the constant is permitted to have a certain range when a high radix is used, the operation may generally be an extremely simple multiplication (for example, $\times 1$, $\times 1.5$ or $\times 2$). Further, in order to obtain a precision which is high enough to express the above range, the bit number of the comparison constant is not necessarily set to have the same bit width of the divisor D and, for example, the comparison constant may be set to have 6 bits when a division of 54 bits is effected. A shifter (partial remainder shifter) 4 shifts the output of the first register 1 to the left by the radix. Subtracters (magnitude comparators) 5-1 and 5-2 respectively receive outputs of the third registers 3-1 and 3-2 as one input and upper bits (in this example, 6 upper bits) of a bit number representing the precision necessary for convergence and included in the outputs of the shifter 4 as the other input and compare the magnitudes of the two inputs to output a signal determining the partial quotient Q. A first selector 6 shifts and selects the output (divisor D) of the second register 2 according to the signs of the quotients Q output from the subtracters 5-1 and 5-2 to create a factor having a value which is an integer multiple of the divisor D. An adder/subtracter 7 is supplied with an output of the first selector 6 and an output of the shifter (partial remainder shifter) 4. The addition or subtraction of the adder/subtracter 7 is selectively specified by a sign bit of the output of the shifter 4 so as to derive a partial remainder $R^{(j+1)}$ in the present cycle. A decoder 8 is supplied with a signal for determining the partial quotient Q and a sign bit of the output from the shifter 4 to output a high-radix sign digit SD. A control counter 9 controls the operation timing of the above circuits.

With the high-radix divider according to the first embodiment of this invention, the division is effected based on the above-described principle and two bits of a partial quotient Q are determined each time one cycle of the operation loop is effected by one clock. Therefore, a high-speed division whose operation speed is twice (which is generally represented by $\log_2 r$) as high as that of the conventional hardware divider utilizing the nonrestoring algorithm based on the repetitive operation system having a radix of 2 can be effected.

Further, the comparison (subtraction) between the comparison constants obtained by subjecting a divisor to predetermined operations and the partial remainder in the preceding cycle is not necessarily effected for all of the bits, and if an error is limited within the redundancy range of the partial remainder, the error can be compensated for in the next operation cycle. More specifically, when a 54-bit division is effected, it is sufficient if, for example, 6 bits of the shifted partial remainder are selected as a bit number representing the precision necessary for convergence and subjected to the comparison (subtraction), and therefore an amount of hardware can be reduced.

Figure 3:
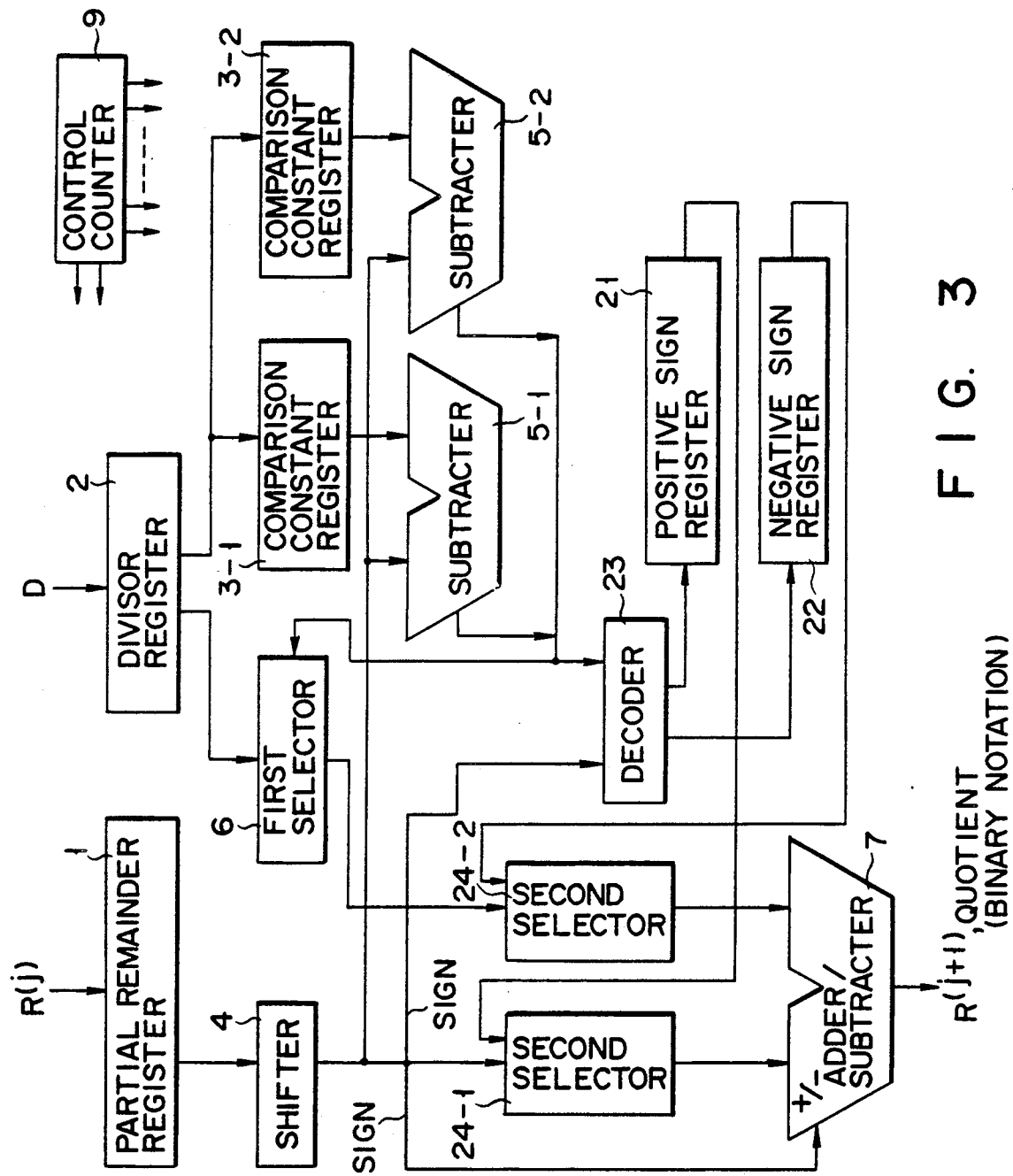

FIG. 3 schematically shows another example of the construction of a high-radix divider based on the repetitive operation system utilizing the algorithm of SRT division having a radix of 4. The high-radix divider is constructed so as to output a quotient represented by a normal binary notation. A positive sign shift register 21, negative sign shift register 22, decoder 23 (substantially the same as the decoder 8) and second selectors 24-1 and 24-2 are provided in addition to the divider having the radix of 4 shown in FIG. 2. The decoder 23 selects positive and negative partial quotients according to the sign of the outputs of the subtracters 5-1 and 5-2. The two shift registers 21 and 22 shift and store the positive and negative partial quotients selected by the decoder 23. The selectors 24-1 and 24-2 are controlled to permit the values stored in the two shift registers 21 and 22 to be input to the adder/subtracter 7 after the completion of convergence of the division. Then, the values are operated by the adder/subtracter 7 so as to be converted into a binary notation The other basic operations are the same as those of the circuit shown in FIG. 2.

FIG. 4 schematically shows a high-radix divider based on the repetitive operation system utilizing the algorithm of SRT division having a radix of 16. The high-radix divider is different from the divider having a radix of 2 and shown in FIG. 2 in that a different number of third registers (comparison constant registers) 3 and subtracters 5 are used, the first selector 6' of different construction is used and a 4-input adder 10 is used in the input circuit of the adder/subtracter 7, and is substantially the same as the latter in other respects.

According to the high-radix divider having a radix of 16, high-speed division can be effected at a speed which is four ($\log_2 r$, $r = 16$) times as high as that of the conventional case by use of a small amount of hardware. More specifically, the operation with doubled precision by FPU defined by the IEEE standard can be effected only by use of $53 \div 4 = 13.25$ clocks, that is, 14 clocks.

In contrast, in order to effect the operation with doubled precision by use of the convergence type division algorithm based on the Newton-Raphson method, three times of convergence (two multiplications and one addition/subtraction) must be effected when the initial value approximation of upper 10 bits is derived by use of a read only memory. In this case, the convergence equation can be expressed as follows:

$$Q^{(i+1)} + Q^{i*}(2 - Q^{(0)*}D)$$

where $Q^i$ and $Q^{(i+1)}$ are partial quotients, $Q^{(0)}$ is an initial value approximation derived by use of a read only memory, and D is a divisor.

As is clearly seen from the above equation, the calculation cannot be made by use of a pipe-line method because of the dependency of data, and if two clocks are necessary for the throughput of the multiplication and addition/subtraction, 6 clocks are used for one convergence. Therefore, $6 \times 3 = 18$ clocks are used to effect the above operation with doubled precision, and it is understood that the operation speed of the high-radix divider having a radix of 16 is higher than that in the above case by $18 - 14 = 4$ clocks. Further, the high-radix divider of this invention has an advantage that an amount of hardware is small since no multiplier is used.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

As described above, according to this invention, since an algorithm based on the repetitive system having a radix which uses the power of 2 and is larger than 2 is used, a high-radix divider capable of effecting a division at a high speed by use of a small amount of hardware can be provided.

What is claimed is:

1. A high-radix divider comprising:

first register means for storing a dividend or a partial remainder;

shift means for shifting an output of said first register means to the left by a radix which uses the power of 2 and is larger than 2;

second register means for storing a divisor;

a plurality of third register means for storing comparison constants obtained by subjecting an output of said second register means to predetermined operations;

a plurality of magnitude comparator means for respectively receiving outputs of said plurality of third register means as one input, receiving upper bits of a bit number representing a precision required for conversion and included in the outputs of said shift means as another input, and comparing the magnitudes of the two inputs with each other to derive partial quotients;

selector means for shifting and selecting the output of said second register means according to the signs of the partial quotients output from said plurality of magnitude comparator means to create a factor having a value equal to the integer multiple of the divisor; and adder/subtracter means for receiving the outputs of said selector means and shift means, the addition or subtraction of said adder/subtracter means being selectively specified by a sign bit of the output of said shift means to derive a partial remainder.

2. A high-radix divider according to claim 1, wherein said magnitude comparator means includes a subtracter.

3. A high-radix divider according to claim 1, wherein said adder/subtracter means includes a carry-save type adder at a stage other than a final stage and one of a carry-look-ahead type adder and a carry-select type adder at the final stage.

4. A high-radix divider according to claim 1, further comprising partial quotient creating means for creating a positive partial quotient and a negative partial quotient based on the signs of outputs of said plurality of magnitude comparing means; first and second shift registers for shifting and storing the positive partial quotient and the negative partial quotient created by said partial quotient creating means; and switching means for permitting values stored in said first and second shift registers to be selectively input to said adder/subtracter means after the completion of convergence of division.

5. A high-radix divider according to claim 4, wherein said partial quotient creation means includes a decoder.

6. A high-radix divider according to claim 4, wherein said switching means includes two selectors.

* * * * *